G. W. TIBBITS.
VEHICLE SPRING.
APPLICATION FILED AUG. 26, 1913.
1,111,045.
Patented Sept. 22, 1914.
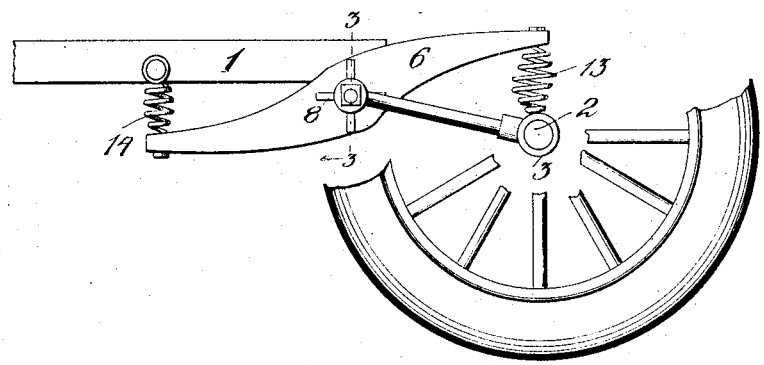
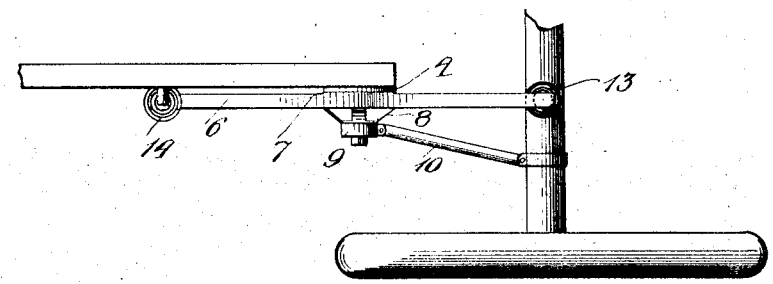
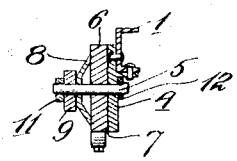

UNITED STATES PATENT OFFICE.

GEORGE W. TIBBITS, OF LOS ANGELES, CALIFORNIA.

VEHICLE-SPRING.

1,111,045.
Specification of Letters Patent. Patented Sept. 22, 1914.
Application filed August 26, 1913. Serial No. 786,807.

*To all whom it may concern:*

Be it known that I, GEORGE W. TIBBITS, a citizen of the United States, residing at Los Angeles, in the county of Los Angeles and State of California, have invented a certain new and useful Improvement in Vehicle-Springs, of which the following is a specification.

My invention relates to a means for resiliently supporting the body of a vehicle from the axles, and has for its objects to provide a regulable vehicle spring arrangement in which the transmission of shocks to the chassis is reduced to a minimum, the wheels of the vehicle are kept on the road, and by means of which rough and uneven roads may be negotiated without noticeably affecting the chassis.

These and other objects are accomplished by the vehicle spring hereinafter described, and shown in the accompanying drawing, in which, Figure 1 is a side elevation showing my invention as applied to the chassis or frame of a vehicle. Fig. 2 is a plan view, and Fig. 3 is a vertical section on lines 3—3, Fig. 1, looking in the direction of the arrow.

Referring to the drawing, 1 indicates a fragment of the frame or chassis of a vehicle. 2 indicates the axle, and 3 is an axle sleeve surrounding said axle 2.

On said chassis 1, is riveted or bolted a disk 4, carrying a bolt 5, on which is pivotally mounted a bar 6, having preferably an integral friction disk 7 at or near its center, arranged to be held in frictional contact with said disk 4, by a spring 8, on said bolt 5. One end 9, of a radius rod 10, is also mounted on said bolt 5, the other end being attached to the axle sleeve 3. Nuts 11 and 12, serve to hold the parts mounted on said bolt 5, in place, the nut 11, serving additionally to regulate the amount of friction between said disks 4 and 7. One end of said bar 6, rests on a compression spring 13, which is connected to said axle sleeve 3, while the other end of said bar is connected to the chassis by a spring 14, preferably of the extension type, as shown.

Said bar 6, as is obvious, acts substantially as a teeter. When the wheels strike inequalities or ruts in the road, the shock is first transmitted to the spring 13, then to the end of the bar to which it is connected, and finally to the spring 14, the movement of the bar in response to jars being regulated by the amount of friction between the plates or disks 4 and 7, which also controls the flexibility of said bar proportionably with the load. The wheels in this manner are kept in close negotiation with the road and the chassis remains practically horizontal at all times.

What I claim, is—

1. The combination with a chassis and an axle, of a plate connected with said chassis, a bar pivotally mounted on said plate, a compression spring connecting one end of said bar with said axle, an extension spring connecting the other end of said spring with said chassis, and means to move said bar in engagement with said plate to frictionally regulate the pivotal movement of said bar.

2. The combination with a chassis and an axle, of a substantially straight bar pivoted on said chassis, a compression spring connecting one end of said bar with said axle, an extension spring connecting the other end of said bar with said chassis in a direct manner, and an intermediate regulable means to move said bar in engagement with said chassis whereby to frictionally regulate the pivotal movement of said bar.

3. The combination with a chassis and an axle, of a bar pivotally mounted at or near its center on said chassis, a compression spring attached to one end of said bar and said axle, an extension spring connected to the other end of said bar and directly to said chassis, and means to cause an engagement of said bar with said chassis to frictionally control the pivotal movement thereof proportionably with the load.

4. The combination with a chassis and an axle, of a plate connected with said chassis, a bar pivotally mounted on said plate, a compression spring connecting one end of said bar with said axle, an extension spring connecting the other end of said bar directly with said chassis, means to cause a frictional engagement of said bar with said chassis, and means to rigidly connect the axle with said chassis.

5. The combination with a chassis and an axle, of a plate connected with said chassis, a bolt extending through said plate, a bar pivotally mounted on said bolt, a compression spring connecting one end of said bar with said axle, an extension spring connecting the other end of said bar with said chassis, a spring on said bolt, a radius rod connecting said chassis with said axle, and means on said bolt to cause a frictional engagement of said bar with plate.

In testimony whereof I affix my signature in the presence of two witnesses.

G. W. TIBBITS.

Witnesses:
W. J. McCann,
G. W. Vanauken.